United States Patent [19]

Clayton et al.

[11] 4,298,342
[45] Nov. 3, 1981

[54] AUTOMATIC BELT TENSIONER

[75] Inventors: Kenneth H. Clayton, Anderson; Charles D. Denniston, Middletown; Donald G. Guetersloh, Anderson; Melvin H. Hallmann, Middletown, all of Ind.

[73] Assignee: General Motors Corporation, Detroit, Mich.

[21] Appl. No.: 101,589

[22] Filed: Dec. 10, 1979

[51] Int. Cl.³ ............................................. F16H 7/12
[52] U.S. Cl. .................................. 474/110; 474/133; 74/141.5
[58] Field of Search ............... 474/110, 133; 254/105, 254/106; 74/141.5

[56] References Cited

U.S. PATENT DOCUMENTS

| 3,406,582 | 10/1968 | Frentzel | 474/110 |
| 3,631,734 | 1/1972 | Wagner | 474/117 |
| 3,785,220 | 1/1974 | Jacobs | 474/110 |
| 3,888,217 | 6/1975 | Hisserich | 474/110 |

FOREIGN PATENT DOCUMENTS

| 2414046 | 10/1974 | Fed. Rep. of Germany | 474/110 |
| 1206028 | 8/1959 | France | 254/106 |
| 1216650 | 12/1970 | United Kingdom | 254/105 |

Primary Examiner—Lawrence J. Staab
Attorney, Agent, or Firm—Donald F. Scherer

[57] ABSTRACT

A belt tensioner has a pair of pivotally mounted cam members which engage a stationary mounting strap. One cam is pivotally mounted on a block which is drivingly connected through a pivotal lever to a linear motor. The one cam is operative to engage a stationary strap when the motor is operated to urge the belt sheave bracket to pivot in a direction to increase the tension in the belt. When the one cam and block are moved by the return stroke of the motor, the other cam, which is mounted on the belt sheave bracket, engages the stationary strap to prevent movement of the belt sheave bracket relative to the strap.

2 Claims, 4 Drawing Figures

AUTOMATIC BELT TENSIONER

This invention relates to belt tensioning devices and more particularly to automatic belt tensioning devices.

It is an object of this invention to provide an improved automatic belt tensioner wherein a vacuum motor is operative through one cam and a pivotal bracket to tighten the belt and another cam is operative to maintain the bracket position and the belt tension when the vacuum motor restrokes.

It is another object of this invention to provide an improved automatic belt tensioner wherein a gripping cam is mounted on a pivotal block which is operated on by a linear motor such that the block is secured to a stationary member through the gripping cam when the motor is operated in one direction wherein a pulley support bracket is moved by the motor in a direction to tighten the belt tension and wherein a locking cam secures the support bracket to the stationary member as the block and gripping cam are moved along the stationary member when the motor operates in the other direction.

These and other objects and advantages of the present invention will be more apparent from the following description and drawings in which.

Figure 1:
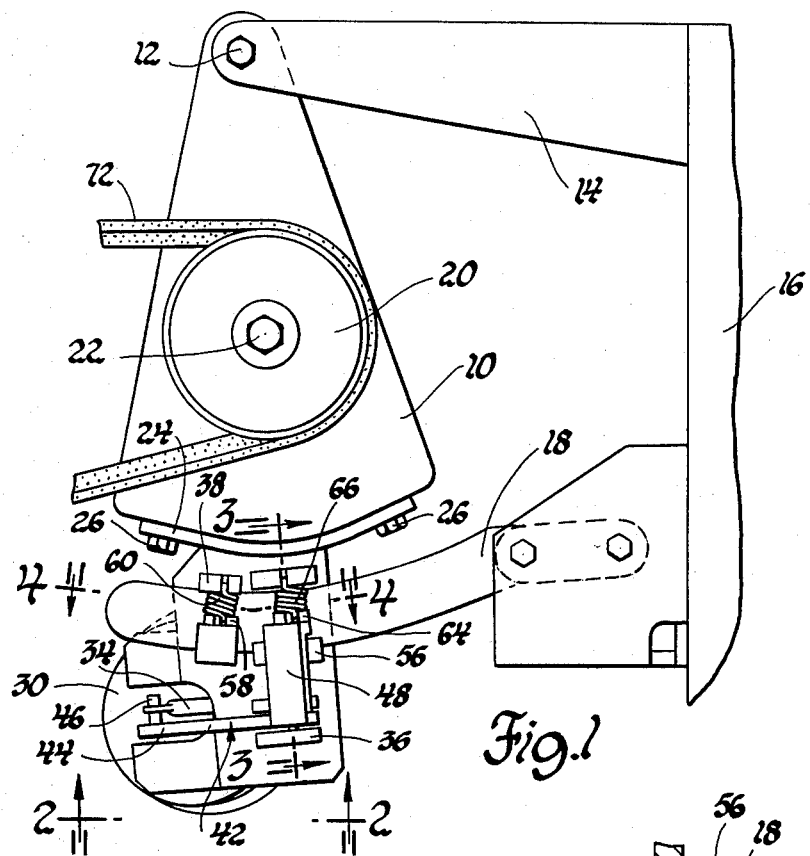
FIG. 1 is a front elevational view of a belt tensioner incorporating the present invention.
Figure 2:
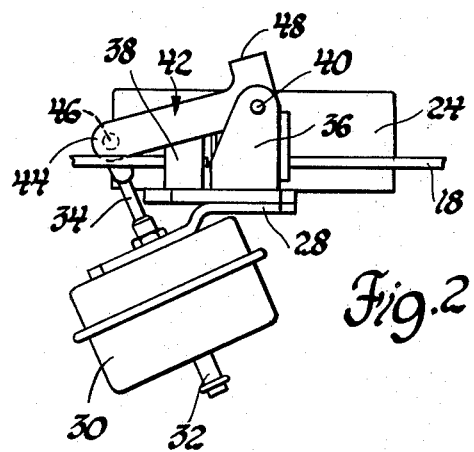
FIG. 2 is a view taken along line 2—2 of FIG. 1.

Referring to the drawings, wherein like characters represent the same or corresponding parts throughout the several views, there is seen in FIG. 1 a pulley or sheave support bracket 10. The bracket 10 is pivotally mounted, by a fastener 12, to an arm 14, which arm 14 is secured to a stationary base member 16. The base member 16 may be an engine block when the tensioning system is used in a vehicle. Also secured to the base member 16 is a strap member 18 which extends in a plane substantially parallel to a plane containing the bracket 10. A pulley or sheave 20 is rotatably mounted to the bracket 10 by a fastener 22.

A motor mounting bracket 24 is secured by a pair of fasteners 26 to the pulley support bracket 10. The motor support bracket 24 has a motor support 28 on which is secured a conventional vacuum motor 30 having a vacuum port or fitting 32 and an output rod 34. Vacuum fitting 32 is adapted to be connected to a conventional vacuum hose which may in turn be connected to a vacuum source such as the inlet manifold of an internal combustion engine.

As is well-known with conventional vacuum motors, the output rod 34 provides a linear working stroke operating in one direction when a vacuum is applied to port 32 and being spring-driven for a return stroke in the opposite direction when the vacuum ceases or at least decreased below a predetermined level. The motor bracket 24 has secured thereto a lever support 36 and a locking cam support 38. The lever support 36 has secured thereto a pin 40 on which is pivotally mounted a lever 42. The lever 42 has an arm 44 which is drivingly connected through a pin 46 to the output rod 34 of vacuum motor 30. The lever 42 also has a substantially U-shaped end 48, one portion 50 of which pivots on pin 40 and another portion 52 of which is connected through a pin 54 to a cam mounting block 56. The lever 42 will pivot relative to the pin 54.

Figure 4:
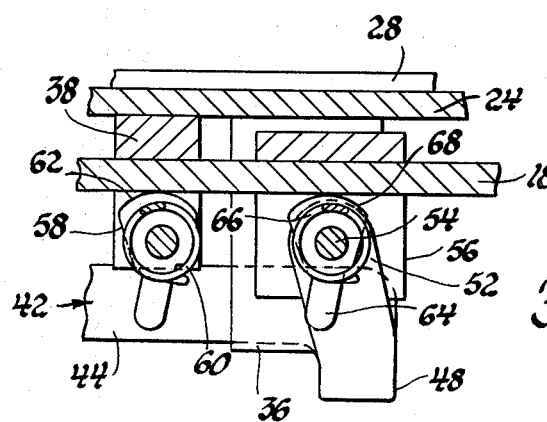
FIG. 4 is a sectional view taken along line 4—4 of FIG. 1.

The locking cam mounting block 38 has pivotally mounted thereon a locking cam 58 which is urged in a clockwise direction, as viewed in FIG. 4, by a torsion spring 60. The cam surface 62 of locking cam 58 is maintained in abutting relationship with the strap 18 by the spring 60. The radius of curvature of cam surface 62 is such that the pulley support bracket 10 and cam support 38 can move to the right, as viewed in FIG. 4, which is counterclockwise about pivot 12, as viewed in FIG. 1. However, if the pulley support bracket 10 attempts to move in a clockwise direction, the cam 58 will engage the strap 18 with sufficient force to prevent relative movement therebetween.

Figure 3:
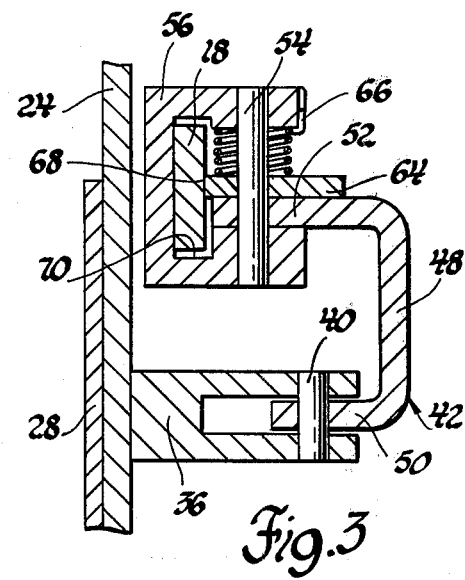
FIG. 3 is a sectional view taken along line 3—3 of FIG. 1.

The block 56 has a gripping cam 64 rotatably mounted thereon by the pin 54. The cam 64 is urged in a clockwise direction about the pin 54 by a torsion spring 66 whereby a cam surface 68 is maintained in abutting relationship with the strap 18. As seen in FIG. 3, the strap 18 passes through a slot 70 formed in the block 56 such that when the cam 64 is operative, the strap 18 is held stationary relative to the block 56. The cam surface 68 is designed such that when the cam is attempted to be rotated in a clockwise direction, relative motion between the block 56 and strap 18 is not permitted while rotation or pivoting of the cam 64 in a counterclockwise direction will permit relative movement between the block 56 and the strap 18.

As seen in FIG. 1, the drive belt 72 is trained about the pulley 20 and in accordance with conventional belt drive systems, the belt 72 may be trained about a number of other pulleys also. As is known in belt drive systems, the tension in belt 72 must be maintained at or above a predetermined level so that slippage between the belt and the pulleys will not occur. The belt tensioner system described above will provide for automatic tensioning of the belt 72 in the following manner.

Assuming that a variable vacuum source, such as an internal combustion engine inlet manifold, is connected to a port 32, the output rod 34 of the vacuum motor 30 will be moved linearly. This will cause pivoting of lever 42 in a clockwise direction, as viewed in FIG. 4. Since the cam 64 will not permit relative motion between the stationary strap 18 and the block 56 in this direction, the pin 54 becomes the pivotal member for lever 42. Since the lever 42 must pivot about pin 54, the pin 40 will pivot clockwise about pin 54, when viewed in FIG. 4. This pivoting motion of pin 40 results in motion of bracket 10 to the right, as viewed in FIG. 4, or counterclockwise, as viewed in FIG. 1. This results in tightening of the tension in belt 72.

When the vacuum level in vacuum motor 30 decreases, the output rod 34 will be spring-returned such that the lever 42 will rotate in a counter-clockwise direction, as viewed in FIG. 4. This motion results in relieving the force between cam 64 and strap 18. Due to the tension in belt 72, the bracket 10 will attempt to pivot in a clockwise direction, as seen in FIG. 1, resulting in a locking engagement between cam 58 and strap 18. This will establish the pin 40 as the pivot member for lever 42. As the lever 42 pivots counter-clockwise about pin 40, the block 56 and cam 64 will move leftward relative to strap 18 as viewed in FIG. 4. Thus, the cam and block will be positioned to provide another driving motion or tensioning motion to the bracket 10 should the vacuum force in motor 30 overcome the spring force therein resulting in linear motion of output rod 34.

It is also possible to reverse the function of the vacuum motor such that the spring driven portion is operative to tighten the belt and the vacuum portion is operative to reset the gripping cam. If this system is utilized, the belt tension will be limited by the spring force available within the motor 30.

It is possible to use a vacuum limiting system on the input to vacuum motor 30 and thereby limit the belt tension that may be obtained at the vacuum drive.

While the system is shown as utilizing a vacuum motor, it is possible to utilize any stepping type motor such as an electric, hydraulic or pneumatic motor which will provide the necessary reciprocating linear output.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A belt tensioner comprising; stationary base means; pulley support means pivotally mounted on said base means; bracket means secured to said base means; pulley means rotatably mounted on said pulley support means; belt means trained on said pulley means; motor means secured to said pulley support means; lever means operatively connected to said motor means and having a pair of pivot axes; and cam means operatively connected to said pulley support means and said bracket means including gripping cam means pivotally and rotatably mounted on said pulley support means and being driven by said motor means through said lever means pivoting on the first of said pair of pivot axes to urge said pulley support means to pivot on said base means and move in one direction relative to said bracket means to increase the tension in said belt means, and locking cam means for engaging said bracket means to prevent relative movement between said pulley support means and said bracket means in the opposite direction while said lever means is pivoted on the second of said pair of pivot axes.

2. A belt tensioner comprising; stationary base means; pulley support means pivotally mounted on said base means; bracket means secured to said base means; pulley means rotatably mounted on said pulley support means; belt means trained on said pulley means; linear motor means secured to said pulley support means and having a working stroke and a return stroke; lever means connected to said linear motor means and having a pair of pivot axes; and cam means operatively connected to said pulley support means and said bracket means including a mounting block pivotally mounted on the first of said pair of pivot axes of said lever means, gripping cam means pivotally mounted on said mounting block and said gripping cam means and said mounting block being driven by said linear motor means through said lever means pivoting on the first of said pair of pivot axes during the working stroke to urge said pulley support means to pivot on said base means and move in one direction relative to said bracket means to increase the tension in said belt means, and locking cam means pivotally mounted on said pulley support means for engaging said bracket means to prevent relative movement between said pulley support means and said bracket means in the opposite direction during the return stroke while said lever means is pivoted on the second of said pair of pivot axes so that said mounting block and said gripping cam means are moved relative to said bracket means.

* * * * *